United States Patent
Maehara et al.

(10) Patent No.: US 10,479,060 B2
(45) Date of Patent: Nov. 19, 2019

(54) CONCEALABLE FILM, LAMINATE, AND PACKAGING MATERIAL

(71) Applicants: Atsushi Maehara, Kyoto (JP); Hiroshi Nishimura, Kyoto (JP); Atsushi Arahira, Kyoto (JP)

(72) Inventors: Atsushi Maehara, Kyoto (JP); Hiroshi Nishimura, Kyoto (JP); Atsushi Arahira, Kyoto (JP)

(73) Assignee: Unitika Ltd., Hyogo (JP)

( * ) Notice: Subject to any disclaimer, the term of this patent is extended or adjusted under 35 U.S.C. 154(b) by 248 days.

(21) Appl. No.: 14/378,212

(22) PCT Filed: Feb. 22, 2013

(86) PCT No.: PCT/JP2013/054442
§ 371 (c)(1),
(2) Date: Aug. 12, 2014

(87) PCT Pub. No.: WO2013/125665
PCT Pub. Date: Aug. 29, 2013

(65) Prior Publication Data
US 2015/0246512 A1 Sep. 3, 2015

(30) Foreign Application Priority Data
Feb. 24, 2012 (JP) .................. 2012-038837

(51) Int. Cl.
| | |
|---|---|
| B32B 27/34 | (2006.01) |
| C08J 5/18 | (2006.01) |
| C08L 77/02 | (2006.01) |
| C08L 77/06 | (2006.01) |
| C08K 3/22 | (2006.01) |
| B32B 27/08 | (2006.01) |
| B32B 27/20 | (2006.01) |

(52) U.S. Cl.
CPC .............. *B32B 27/34* (2013.01); *B32B 27/08* (2013.01); *B32B 27/20* (2013.01); *C08J 5/18* (2013.01); *C08K 3/22* (2013.01); *C08L 77/02* (2013.01); *C08L 77/06* (2013.01); *B32B 2307/4026* (2013.01); *B32B 2307/7246* (2013.01); *B32B 2439/00* (2013.01); *B32B 2439/70* (2013.01); *C08J 2377/02* (2013.01); *C08J 2477/06* (2013.01); *C08J 2479/04* (2013.01); *C08K 2003/2241* (2013.01); *Y10T 428/2848* (2015.01); *Y10T 428/31728* (2015.04); *Y10T 428/31732* (2015.04)

(58) Field of Classification Search
CPC .... B32B 2307/4026; B32B 2307/7246; B32B 2439/00; B32B 2439/70; B32B 27/08; B32B 27/20; B32B 27/34; C08J 2377/02; C08J 2477/06; C08J 2479/04; C08J 5/18; C08K 2003/2241; C08K 3/22; C08L 77/02; C08L 77/06; Y10T 428/2848; Y10T 428/31728; Y10T 428/31732
See application file for complete search history.

(56) References Cited

U.S. PATENT DOCUMENTS

| | | | | |
|---|---|---|---|---|
| 5,106,693 A | * | 4/1992 | Harada | ................... B32B 27/34 428/412 |
| 5,371,122 A | | 12/1994 | Kawahara et al. | |
| 5,562,996 A | * | 10/1996 | Kuriu | ...................... B32B 27/34 428/474.4 |
| 6,399,684 B1 | * | 6/2002 | Talkowski | ............... C08K 3/32 524/133 |

FOREIGN PATENT DOCUMENTS

| | | | | |
|---|---|---|---|---|
| EP | 0408390 A1 | * | 1/1991 | ............. B32B 27/34 |
| JP | 08-118569 | | 5/1996 | |
| JP | 3057753 | | 4/2000 | |
| JP | 2000-233443 | | 8/2000 | |
| JP | 2004-107536 | | 4/2004 | |
| JP | 2005-330478 | | 12/2005 | |
| JP | 2009274224 A | * | 11/2009 | |
| JP | 2011-26486 | | 2/2011 | |
| JP | 2011-183663 | | 9/2011 | |
| JP | 2012-016925 | | 1/2012 | |
| WO | 2010/084846 | | 7/2010 | |

OTHER PUBLICATIONS

Machine translation of WO 2010084846 (2010).*
Machine translation of JP 2009-274224. (Year: 2009).*
English language machine translation for JP 2000-233443.
English language abstract for WO 2010/084846.
English language machine translation for JP 2004-107536.
English language machine translation for JP 3057753 (= JP Application Laid-open No. 05-070687).
English language machine translation for JP 2011-026486.
English language machine translation for JP 2005-330478.
Japanese Office Action dated Nov. 15, 2016 in Japanese Application No. 2014-500937.
English language machine translation of JP 08-118569.
English language machine translation of JP 2012-016925.
English language machine translation of JP 2011-183663.
Chinese Office Action dated Jan. 4, 2017 in corresponding Chinese Patent Application No. 201380007533.6.

* cited by examiner

*Primary Examiner* — John D Freeman
(74) *Attorney, Agent, or Firm* — Fildes & Outland, P.C.

(57) ABSTRACT

A concealable film including 10 to 94% by mass of a crystalline polyamide resin, 1 to 40% by mass of an amorphous polyamide resin and 5 to 50% by mass of titanium oxide, with the proviso that the total content of these is 100% by mass.

12 Claims, 1 Drawing Sheet

CONCEALABLE FILM, LAMINATE, AND PACKAGING MATERIAL

TECHNICAL FIELD

The present invention relates to a concealable film, a laminate using the concealable film, and a packaging material using the concealable film, and relates to, for example, a concealable film usable as the inner layers of various food packaging materials, in particular, packaging bags, and a laminate and a packaging material using such a concealable film.

BACKGROUND ART

As a film to which concealability is imparted, there have been known a film in which a resin layer containing a large amount of a pigment composed of inorganic particles or organic particles is laminated on the surface of a thermoplastic film or a film formed by using a thermoplastic resin to which a pigment is directly added.

For example, Patent Literature 1 described a concealable film containing titanium oxide as a pigment and polyamide resin as a thermoplastic resin, and has proposed a packaging material constituted with a concealable laminate (barrier resin layer/concealable film/sealant layer) formed by laminating a barrier resin layer and a sealant layer on the concealable film.

CITATION LIST

Patent Literature

Patent Literature 1: International Publication No. WO 2010084846

SUMMARY OF INVENTION

Technical Problem

The packaging material is white because the concealable film includes titanium oxide. However, when a content containing oil and water is packed in the packaging material and subjected to retorting treatment, the portion of the packaging material in contact with the oil and the portion of the packaging material in contact with water are different from each other in whiteness as the case may be. The difference of whiteness is observed as if it were shade unevenness, and hence unfortunately the exterior appearance of the packaging material is remarkably impaired.

The technical problem of the present invention is to provide a packaging material the exterior appearance of which is not impaired even when a content containing oil and water is packed in the packaging material and is subjected to retorting treatment, and further, which is excellent in concealability and light shielding property, and to provide a laminate and a concealable film to constitute the packaging material.

Solution to Problem

The present inventors made a diligent investigation, and consequently have perfected the present invention by discovering that the technical problem can be solved by making an amorphous polyamide resin be contained in a specific content in a concealable film including titanium oxide.

Specifically, the gist of the present invention is the following (1) to (13).

(1) A concealable film including 10 to 94% by mass of a crystalline polyamide resin, 1 to 40% by mass of an amorphous polyamide resin and 5 to 50% by mass of titanium oxide, with the proviso that the total content of these is 100% by mass.

(2) A concealable film wherein on at least one surface of a layer A including 1 to 40% by mass of an amorphous polyamide resin, 10 to 60% by mass of titanium oxide and 0 to 89% by mass of a crystalline polyamide resin, with the proviso that the total content of these is 100% by mass, a layer B constituted with a polyamide resin and not including titanium oxide is laminated.

(3) The concealable film according to (1) or (2), wherein the degree of concealability thereof is 0.3 or more.

(4) The concealable film according to any one of (1) to (3), wherein the main component of the crystalline polyamide resin is nylon 6.

(5) The concealable film according to any one of (2) to (4), wherein the main component of the polyamide resin constituting the layer B is nylon 6.

(6) The concealable film according to any one of (1) to (5), further including a hindered amine-based light stabilizer, wherein the content of the hindered amine-based light stabilizer is 0.01 to 2 parts by mass in relation to 100 parts by mass of the total content of the crystalline polyamide resin, the amorphous polyamide resin and titanium oxide.

(7) The concealable film according to any one of (2) to (6), wherein the laminate strength between the layer A and the layer B after a retorting treatment at 120° C. for 30 minutes is 3.0 N/cm or more.

(8) The concealable film according to any one of (1) to (7), wherein the film is subjected to a simultaneous biaxial stretching.

(9) A laminate wherein a water vapor-barrier film is laminated on one surface of the concealable film according to any one of (1) to (8), and a sealant film is laminated on the other surface of the concealable film according to any one of (1) to (8).

(10) The laminate according to (9), wherein the water vapor permeability of the water vapor-barrier film is 70 g/m²·day (40° C., 90% RH) or less.

(11) A packaging material constituted with the laminate according to (9) or (10).

(12) The packaging material according to (11) for packing a content containing water and oil.

(13) The packaging material according to (12) to be used for retorting treatment.

Advantageous Effects of Invention

According to the concealable film of the present invention, by including in the film an amorphous polyamide resin in a specific content along with titanium oxide, even when a content containing oil and water is packed in a packaging material using the film and is subjected to retorting treatment, no shade unevenness of whiteness is observed in the packaging material and the exterior appearance of the packaging material is not impaired. The concealable film of the present invention can be suitably used as a material for constituting a packaging material.

DESCRIPTION OF EMBODIMENTS

Figure 1:
FIG. 1 is an image of the exterior appearance, after retorting treatment, of a packaging bag using the concealable film of Example 24.

Hereinafter, the present invention is described in detail.

The concealable film of the present invention is a film having a single layer structure composed of a polyamide resin layer including titanium oxide, or a film having a multilayer structure composed of a polyamide resin layer (layer A) including titanium oxide and a polyamide resin layer (layer B) not including titanium oxide, wherein in the film having either of the structures, the polyamide resin layer including titanium oxide includes an amorphous polyamide resin in a specific amount.

In the case where the concealable film of the present invention has a single layer structure, the concealable film is required to include 10 to 94% by mass of a crystalline polyamide resin, 1 to 40% by mass of an amorphous polyamide resin, and 5 to 50% by mass of titanium oxide, with the proviso that the total content of these is 100% by mass.

Alternatively, in the case where the concealable film of the present invention has a multilayer structure, the polyamide resin layer (layer A) including titanium oxide is required to include 1 to 40% by mass of an amorphous polyamide resin, 10 to 60% by mass of titanium oxide and 0 to 89% by mass of crystalline polyamide resin, with the proviso that the total content of these is 100% by mass.

As described above, the concealable film having a single layer structure of the present invention includes a crystalline polyamide resin and an amorphous polyamide resin. In the present invention, the crystalline polyamide resin and the amorphous polyamide resin are classified as follows. Specifically, the polyamide resin in which the melting heat quantity measured by using a differential scanning calorimeter (DSC), under nitrogen atmosphere at a temperature increase rate of 16° C./min is larger than 1 cal/g is defined as the crystalline polyamide resin, and the polyamide resin having a melting heat quantity of 1 cal/g or less as measured in the same manner as described above is defined as the amorphous polyamide resin.

[Concealable Film Having Single Layer Structure]

Examples of the crystalline polyamide resin usable in the concealable film of the present invention include nylon 6, nylon 66, nylon 46, nylon 69, nylon 610, nylon 612, nylon 11, nylon 12 and polymetaxylylene adipamide (nylon MXD6), and mixtures, copolymers and complexes of these. Among these, in particular, it is preferable to adopt, as the main component, nylon 6 excellent in cost performance from the viewpoint of productivity or performance; the content of nylon 6 in the crystalline polyamide resin is preferably 80% by mass or more, more preferably 90% by mass or more and furthermore preferably 100% by mass.

The crystalline polyamide resin may be subjected to a terminal blocking for the purpose of suppressing the production of monomers at the time of melting. Examples of the terminal blocking agent to be used include organic glycidyl esters, dicarboxylic acid anhydrides, monocarboxylic acids such as benzoic acid and diamines.

The relative viscosity of the crystalline polyamide resin is not particularly limited. However, the relative viscosity measured by using 96% sulfuric acid as a solvent under the conditions of a temperature of 25° C. and a concentration of 1 g/dl is preferably 1.5 to 5.0, more preferably 2.5 to 4.5 and furthermore preferably 3.0 to 4.0. When the relative viscosity of the crystalline polyamide resin is less than 1.5, the mechanical properties of the obtained film tends to be remarkably degraded; when the relative viscosity exceeds 5.0, the film formability of the film tends to be disturbed.

In the concealable film having a single layer structure of the present invention, the content of the crystalline polyamide resin is required to be 10 to 94% by mass, and is preferably 50 to 85% by mass. When the content of the crystalline polyamide resin is less than 10% by mass, the mechanical properties are degraded, additionally the breakage frequency is increased at the time of stretching, and the productivity tends to be degraded. On the other hand, when the content of the crystalline polyamide resin exceeds 94% by mass, titanium oxide cannot be contained in a required content, the degree of concealability of the film is sometimes less than 0.3, and no sufficient light shielding property can be obtained.

The concealable film having a single layer structure of the present invention is required to contain, along with the crystalline polyamide resin, the amorphous polyamide resin in a content of 1 to 40% by mass, and contains the amorphous polyamide resin preferably in a content of 5 to 20% by mass.

When the content of the amorphous polyamide resin is less than 1% by mass, in a case where a content containing oil and water is packed in a packaging material constituted with a laminate composed of three layers, a water vapor-barrier film/a concealable film/a sealant film, and subjected to retorting treatment, the difference of the degree of whiteness between the portion in contact with oil and the portion in contact with water is remarkable, and the whole of the packaging material undergoes shade unevenness. The shade unevenness remarkably impairs the exterior appearance of the packaging material, and the commercial value of the packaged goods is degraded in the applications requiring high designability. However, when the amorphous polyamide resin is included in the concealable film in a content of 1% by mass or more, even in the case where a content containing oil and water is packed in the packaging material and subjected to retorting treatment, the difference of the degree of whiteness between the portion in contact with oil and the portion in contact with water is hardly found, and the occurrence of the shade unevenness to impair the designability can be suppressed.

On the other hand, when the content of the amorphous polyamide resin exceeds 40% by mass, the mechanical properties of the concealable film are remarkably degraded.

The amorphous polyamide resin used in the present invention is, as described above, a polyamide resin having a melting heat quantity of 1 cal/g or less. As the dicarboxylic acid component constituting the amorphous polyamide resin, terephthalic acid and/or isophthalic acid is preferable, and as the diamine component constituting the amorphous polyamide resin, an alicyclic diamine and/or an aliphatic diamine is preferable. Specific examples of the diamine component include hexamethylenediamine, 4,4'-diaminodicyclohexylenemethane and isophoronediamine. The amorphous polyamide resin may also be products obtained by further copolymerizing a lactam component or an isocyanate component such as 4,4'-diphenylmethane diisocyanate with the above-described components.

Examples of commercially available amorphous polyamide resins include "Grivory XE3038," "Grivory XE3653" and "Grilamid" manufactured by EMS-Chemie AG, "Sealer PA3426" manufactured by Du-Pont Mitsui Polychemicals Co., Ltd. and "Novamid X21" manufactured by Mitsubishi Engineering-Plastics Corp. These resins may be used each alone or as mixtures of two or more thereof.

The concealable film of the present invention include titanium oxide, and in the concealable film having a single layer structure, the content of titanium oxide is required to be 5 to 50% by mass and is preferably 10 to 30% by mass. When the content of titanium oxide is less than 5% by mass, the degree of concealability of the film is sometimes less than 0.3, and no sufficient light shielding property can be obtained. On the other hand, when the content of titanium oxide exceeds 50% by mass, in the concealable film, the mechanical properties are degraded, additionally the breakage frequency is increased at the time of stretching, and the productivity tends to be degraded.

Examples of the crystal structure of titanium oxide include the anatase type, the rutile type and the brookite type, and the rutile type is preferable from the viewpoint of the improvement of the concealability.

Titanium oxide is known to have a photoactive effect. Specifically, when titanium oxide is irradiated with ultraviolet light, free radicals are generated on the surface of the titanium oxide particles. When the free radicals are incorporated into the polymer matrix, the decomposition of the polymer chains is caused, to offer a factor for yellowing of the film. Accordingly, it is preferable to apply a surface treatment to the titanium oxide particles. As the surface treatment, there are an inorganic treatment and an organic treatment.

Examples of the inorganic treatment include an alumina treatment, a silica treatment, a titania treatment, a zirconia treatment, a tin oxide treatment, an antimony oxide treatment and a zinc oxide treatment; among these, the alumina treatment is preferable.

Examples of the organic treatment may include: treatments using treatment agents based on polyols such as pentaerytrit and trimethylolpropane; treatments using amine-based treatment agents such as triethanolamine, trimethylolamine; and treatments using silicone-based treatment agents such as silicone resin and alkylchlorosilane.

The particle size of titanium oxide is not particularly limited, but the average particle size of titanium oxide is preferably 0.1 to 0.5 µm and more preferably 0.2 to 0.4 µm. When the average particle size is less than 0.1 µm, the dispersibility of titanium oxide in the polyamide resin is low, and sometimes coarse aggregates of titanium oxide are scattered in the polyamide resin to generate pinholes in films to degrade the value of the films. On the other hand, when the average particle size exceeds 0.5 µm, the breakage frequency of the films at the time of formation of films tends to be increased to degrade the productivity.

The method for mixing titanium oxide in the polyamide resin is not particularly limited; at an optional time in the course of the production, titanium oxide can be mixed in the polyamide resin. Examples of the method for mixing titanium oxide in the polyamide resin include: a method in which titanium oxide is added at the time of polymerization of the polyamide resin; a method (master batch method) in which a master batch includes a high concentration of titanium oxide mixed by kneading in the polyamide resin is produced, and the master batch is added to and diluted in the polyamide resin; and a method in which the polyamide resin and titanium oxide are melt-mixed with an extruder.

In the present invention, a method is preferably adopted in which by using the master batch method, before the film formation, the regulation to the intended titanium oxide concentration is performed.

The concealable film of the present invention is allowed, as described above, to have a single layer structure including the crystalline polyamide resin, the amorphous polyamide resin and titanium oxide, and thus can be used satisfactorily as a film allowing easy film formation.

[Concealable Film Having Multilayer Structure]

On the other hand, by allowing the concealable film to have a multilayer structure in which a polyamide resin layer (layer B) not including titanium oxide is laminated on at least one surface of the polyamide resin layer (layer A) including titanium oxide, the mechanical properties of the concealable film having the multilayer structure can be improved as compared to the concealable film having a single layer structure. The layer A and the layer B in the concealable film having a multilayer structure may be each present in a plurality of numbers.

The layer A of the concealable film having a multilayer structure is required to include 1 to 40% by mass of the amorphous polyamide resin, 10 to 60% by mass of titanium oxide and 0 to 89% by mass of crystalline polyamide resin, with the proviso that the total content of these is 100% by mass. As these components constituting the layer A, the same components as the components constituting the concealable film having a single layer structure can be used.

The content of the amorphous polyamide resin in the layer A of the concealable film having a multilayer structure is required to be 1 to 40% by mass and is preferably 5 to 20% by mass, because of the same reasons as in the case of the concealable film having a single layer structure.

The layer A of the concealable film having a multilayer structure is allowed to have an excellent laminate strength with the layer B even after retorting treatment, by including the amorphous polyamide resin. Titanium oxide sometimes aggregates under the retorting treatment conditions, and the film layer including titanium oxide is sometimes decreased in the laminate strength with the adjacent film layer after retorting treatment. However, by including the amorphous polyamide resin in the film layer including titanium oxide, the aggregation of titanium oxide can be suppressed, and the layer A can have an excellent laminate strength with the layer B even after retorting treatment.

Because the concealable film having a multilayer structure has the polyamide resin layer (layer B) not including titanium oxide, the content of titanium oxide in the layer A is larger than in the case of the concealable film having a single layer structure, and is required to by 10 to 60% by mass and is preferably 10 to 50% by mass. When the content of titanium oxide is less than 10% by mass, no sufficient degree of concealability is obtained. On the other hand, when the content of titanium oxide exceeds 60% by mass, the breakage frequency is increased at the time of stretching a film having a multilayer structure, and the productivity tends to be degraded.

As the method for mixing titanium oxide in the polyamide resin, the same methods as in the case of the concealable film having a single layer structure can be adopted.

The layer A of the concealable film having a multilayer structure is required, as described above, to include the amorphous polyamide resin and titanium oxide, but need not include the crystalline polyamide resin. However, in order to improve the mechanical properties of the concealable film, the layer A preferably includes the crystalline polyamide resin. Accordingly, the content of the crystalline polyamide resin in the layer A of the concealable film is 0 to 89% by mass, preferably 10 to 89% by mass and more preferably 30 to 85% by mass.

The layer B of the concealable film having a multilayer structure is constituted with a polyamide resin, but does not include titanium oxide. Examples of the polyamide resin constituting the layer B include the foregoing crystalline polyamide resins or the foregoing amorphous polyamide resins; among these, in particular, it is preferable to adopt, as the main component, nylon 6 excellent in cost performance from the viewpoint of productivity or performance; the content of nylon 6 in the polyamide resin constituting the layer B is preferably 80% by mass or more, more preferably 90% by mass or more and furthermore preferably 100% by mass.

In the concealable film having a multilayer structure, the ratio (A/B) between the thickness of the layer A (in the case where there are a plurality of the layers A, the total thickness thereof) and the thickness of the layer B (in the case where there are a plurality of the layers B, the total thickness thereof) is preferably 1/4 to 6/1. In the case where the ratio between the thickness of the layer A and the thickness of the layer B falls within this range, it is easy to regulate the property such as the concealability, and it is also possible to allow the concealable film having a multilayer structure to have sufficient mechanical properties.

Examples of the layer structure of the concealable film having a multilayer structure include: a 2-type 2-layer structure such as (A)/(B); 2-type 3-layer structures such as (B)/(A)/(B) and (A)/(B)/(A); and 2-type 5-layer structures such as (B)/(A)/(B)/(A)/(B). Among these, because of being simple in the thickness control and excellent in the balance in mechanical properties and the like, the 2-type 3-layer structure (B)/(A)/(B) having the layers B as the outer layers is preferable.

By adopting the layers B not including titanium oxide as the outer layers, the oozing of titanium oxide onto the film surface can be prevented, and additionally it is possible to provide the concealable film with surface smoothness. Accordingly, it is possible to obtain a concealable film which does not lose the printability and halftone property intrinsically possessed by polyamide resin.

[Additives]

The concealable film of the present invention includes titanium oxide, and titanium oxide has a photoactive effect as described above, and offers a factor for yellowing of the film. Accordingly, in order to suppress this effect, the concealable film preferably includes a hindered amine-based light stabilizer along with titanium oxide.

The content of the hindered amine-based light stabilizer, in the concealable film having a single layer structure or also in the layer A of the concealable film having a multilayer structure, is preferably 0.01 to 2 parts by mass and more preferably 0.1 to 1 part by mass, in relation to 100 parts by mass of the total content of the crystalline polyamide resin, the amorphous polyamide resin and titanium oxide.

When the content of the hindered amine-based light stabilizer is less than 0.01 part by mass, it is impossible to more effectively suppress the photooxidation reaction caused by the radicals (such as alkyl radicals and peroxy radicals) generated by the irradiation of titanium oxide with ultraviolet light irradiation, and hence the weather resistance of the concealable film is insufficient, and the degradation of the tensile strength or the tensile elongation due to oxidation degradation is sometimes caused in the concealable film. On the other hand, when the content of the hindered amine-based light stabilizer exceeds 2 parts by mass, a failure such as bleed out is sometimes caused.

The hindered amine-based light stabilizer used in the present invention is only required to be a light stabilizer which suppresses the photooxidation reaction by trapping the radicals generated by the ultraviolet light irradiation, and is exemplified by, for example, a compound having a hindered piperidine skeleton. Specific examples of the hindered-amine light stabilizer include: bis(1,2,2,6,6-pentamethyl-4-piperidyl)[[3,5-bis(1,1-dimethylethyl)-4-hydrixyphenyl]methyl]butyl malonate, bis(2,2,6,6-tetramethyl-4-piperidyl) sebacate, and poly[(6-(1,1,3,3-tetramethylbutyl)amino-1,3,5-triazine-2,4-diyl}{(2,2,6,6-tetramethyl-4-piperidyl)imino}hexamethylene {(2,2,6,6-tetramethyl-4-piperidyl)imino}].

The concealable film of the present invention can include, if necessary, within a range not adversely affecting the performance of the film, one or two or more of a pigment other than titanium oxide, a light stabilizer other than the hindered amine-based light stabilizer, an antioxidant, an ultraviolet absorber, a preservative, an antistatic agent, an antiblocking agent and an inorganic fine particle.

The concealable film may also include a lubricant, for example, for the purpose of improving the slip properties of the film. As the lubricant, both an inorganic lubricant and an organic lubricant can be used. Specific examples of the lubricant include: clay, talc, calcium carbonate, zinc carbonate, wollastonite, silica, alumina, magnesium oxide, calcium silicate, sodium aluminate, calcium aluminate, magnesium aluminosilicate, glass balloon, carbon black, zinc oxide, antimony trioxide, zeolite, hydrotalcite, layered silicate and ethylene bis-stearic acid amide. Among these, silica is preferable. The content of the lubricant is preferably 0.01 to 0.3% by mass of the content of the polyamide resin.

[Physical Properties]

The degree of concealability of the concealable film of the present invention is preferably 0.3 or more, more preferably 0.4 or more and furthermore preferably 0.5 or more. When the degree of concealability is less than 0.3, the concealability and the light shielding property are insufficient, and hence unpreferably, the content is sometimes seen from the outside, or the content containing oil or the like tends to be oxidized and degraded. In order to set the degree of concealability of the concealable film at 0.3 or more, the content of titanium oxide may be regulated within the range specified in the present invention, and at the same time, the thickness of the concealable film may be regulated.

The degree of concealability as referred to in the present invention means the optical density (O.D.) measured with an optical densitometer. The larger this value, the higher the concealability.

In the concealable film having a multilayer structure of the present invention, the laminate strength between the layer A and the layer B after a retorting treatment at 120° C. for 30 minutes is preferably 3.0 N/cm or more. When the laminate strength is less than 3.0 N/cm, the possibility of the occurrence of delamination is high in the packaging material after hydrothermal treatment, in particular, retorting treatment.

As described above, titanium oxide sometimes aggregates under the retorting treatment conditions, and the film layer including titanium oxide is sometimes decreased after retorting treatment in the laminate strength with the adjacent film layer. However, the layer A including titanium oxide includes the amorphous polyamide resin, hence can suppress the aggregation of titanium oxide, and can have an excellent laminate strength with the layer B even after retorting treatment.

The tensile strength of the concealable film of the present invention is preferably 180 MPa or more and more preferably 190 to 220 MPa. When the tensile strength is less than 180 MPa, no sufficient mechanical strength is obtained.

The tensile elongation of the concealable film of the present invention is, from the same viewpoint for the tensile strength, preferably 80% or more and more preferably 90 to 120%.

The thickness of the concealable film of the present invention can be appropriately selected according to, for example, the required degree of concealability, the intended mechanical strength, or the intended degree of whiteness. When the concealable film of the present invention is used for a packaging material, the thickness thereof is, from the viewpoint of the mechanical strength or the easiness in handling, preferably 10 to 30 μm and more preferably 15 to 30 μm. When the thickness is less than 10 μm, no sufficient mechanical strength is obtained.

[Production Method]

The concealable film of the present invention can be produced by the following method and the like.

The concealable film having a single layer structure can be produced, for example, as follows: the crystalline polyamide resin, the amorphous polyamide resin and titanium oxide are heat melted in an extruder and the resulting molten mixture is extruded from a T-die in a film shape; the extruded film is cooled and solidified on a rotating cooling drum by a heretofore known casting method such as an air knife casting method or an electrostatic casting method to form an unstretched film; and the unstretched film is subjected to a stretching treatment to produce the concealable film.

The concealable film having a multilayer structure can be produced, for example, as follows: the component constituting the layer A is extruded from a first extruder, and the component constituting the layer B is extruded from a second extruder; these components are superposed on each other so as to form an intended layer structure, and thus an unstretched film having a multilayer structure is formed; then, the unstretched film is subjected to the same treatment as described above to produce the concealable film.

In order to maintain sufficient mechanical properties, the concealable film of the present invention is preferably a stretched film. When the film before stretching is oriented, the stretchability is sometimes degraded in the subsequent step, and hence the film before stretching is preferably in a state of being substantially amorphous or being substantially nonoriented.

The stretching magnification of the stretched film is preferably 1.5 or more in the case of uniaxial stretching. In the case of longitudinal and transverse biaxial stretching, the stretching magnification is 1.5 or more for each of the longitudinal and transverse directions, and the area magnification is usually 3 or more, preferably 6 to 20, and more preferably 6.5 to 13. By adopting the above-described ranges, it is possible to obtain films excellent in mechanical properties.

The method for stretching a film is not particularly limited, but a simultaneous biaxial stretching method is preferable.

By applying a simultaneous biaxial stretching method, it is generally possible to allow the film to have at the same time the practical properties such as mechanical properties, optical properties, thermal dimensional stability and antipinhole property.

Other reasons why the simultaneous biaxial stretching method is preferable may include the fact that in the successive biaxial stretching method performing longitudinal stretching followed by transverse stretching, the oriented crystallization of the film proceeds during the longitudinal stretching to degrade the stretchability of the polyamide resin during the transverse stretching, and hence the breakage frequency of the film tends to be increased in the case where the titanium oxide concentration is high.

The biaxially oriented polyamide-based resin film is lower in dimensional stability as compared to the biaxially oriented polyester-based resin film. Accordingly, in general, when the biaxially oriented polyamide-based resin film is used as a packaging bag, a curling phenomenon occurs, hence an automatic packing apparatus cannot accurately grasp the bag so as to open the bag opening, and thus unfortunately the content such as food leaks out. Such a phenomenon remarkably occurs in the successive biaxial stretching method. Such a phenomenon grows gradually on going to the ends in the widthwise direction of the film, and accordingly, in a packaging bag formed by cutting the film in half and superposing the widthwise end of the film and the central portion of the film on each other, a shrinkage coefficient difference occurs so as to make the front side and the back side of the bag be different in dimension, and hence the curling phenomenon occurs. In order to suppress the curling phenomenon, it is preferable to adopt the simultaneous biaxial stretching method capable of producing a film suppressed in the so-called bowing phenomenon, which is a film having a uniform physical property in the widthwise direction.

A film subjected to a stretching treatment step is thermally fixed at a temperature of 150 to 220° C. in the tenter with which the stretching treatment has been performed and, if necessary, subjected to a relaxation treatment in the longitudinal direction and/or the transverse direction within a range of 0 to 10% and preferably within a range from 2 to 6%.

In order to reduce the thermal shrinkage coefficient of the obtained concealable film, in addition to the optimization of the temperature and the time at the time of thermal fixing, it is preferable to perform the thermal relaxation treatment at a temperature lower than the highest temperature of the thermal fixing temperature.

To the concealable film having a single layer structure or a multilayer structure, if necessary, a surface treatment such as corona discharge treatment may be applied.

[Laminate]

The laminate of the present invention is a laminate in which a water vapor-barrier film is laminated on one surface of the concealable film and a sealant film is laminated on the other surface of the concealable film.

By imparting heat sealing property to the laminate by laminating the sealant film on the concealable film, the laminate can constitute packaging bags and can be used as, for example, a lid material for tray packaging.

As the resin constituting the sealant film, hitherto known resins can be used; examples of such a resin include: polyethylenes such as low density polyethylene (LDPE) and high density polyethylene (HDPE); and polyolefin resins such as acid-modified polyethylene, polypropylene, acid-modified polypropylene, copolymerized polypropylene, ethylene-vinyl acetate copolymer, ethylene-(meth)acrylate copolymer, ethylene-(meth)acrylic acid copolymer and ionomer. Among these, polyethylene resin and acid-modified ethylene resin are preferable; in particular, acid-modified polyethylene resin is most preferable because acid-modified polyethylene resin allows packaging materials to acquire low-temperature heat sealing property. These resins may be used each alone, may be used as copolymerized or melt-mixed with other resins or components, or may be used, for example, as modified.

The sealant film includes these resin components and may be of a single layer structure or of a multilayer structure. The thickness of the sealant film is determined according to the intended applications; however, in general, the thickness of the sealant film is 15 to 200 μm.

By laminating a water vapor-barrier film on the concealable film, the laminate can acquire water vapor barrier property.

Examples of the water vapor-barrier film include: vapor deposited films using silica vapor deposition, alumina vapor deposition and silica-alumina binary vapor deposition; and organic barrier films formed with vinylidene chloride-based resins, modified polyvinyl alcohol, ethylene-vinyl alcohol copolymer and MXD nylon. The water vapor-barrier film may also be a silica-based (inorganic-organic hybrid) barrier film obtained by the sol-gel method.

From the viewpoint of the barrier property, vapor deposited films using silica vapor deposition or alumina vapor deposition are preferable; the thickness of the vapor deposited film is not particularly limited, but preferably falls within a range from 3 to 50 μm from the economical viewpoint.

In the water vapor-barrier film, the water vapor permeability is preferably 70 $g/m^2 \cdot day$ (40° C., 90% RH) or less, more preferably 20 $g/m^2 \cdot day$ or less and furthermore preferably 10 $g/m^2 \cdot day$ or less. When the water vapor permeability exceeds 70 $g/m^2 \cdot day$ (40° C., 90% RH), practically, it is difficult to use the water vapor-barrier film in the application to, for example, retorting treatment.

Examples of commercially available vapor deposited films include: "IB Series" manufactured by Dai Nippon Printing Co., Ltd., "GL, GX Series" manufactured by Topan Printing Co., Ltd., "Barrier-Locks" manufactured by Toray Advanced Film Co., Ltd., "Tecbarrier" manufactured by Mitsubishi Plastics, Inc., "MOS" manufactured by Oike & Co., Ltd. and "Ecosyar" manufactured by Toyobo Co., Ltd. Examples of commercially available organic barrier film include: "Kurarister" manufactured by Kuraray Co., Ltd., "Besela" manufactured by Kureha Chemical Industry Co., Ltd., "Superneal" manufactured by Mitsubishi Plastics, Inc., "Kohbarrier" manufactured by Kohjin Co., Ltd. and "Senesi" manufactured by Daicel Corp.

Examples of the method for laminating the sealant film or the water vapor-barrier film on the concealable film include: lamination methods such as a dry lamination method, a wet lamination method, a solvent-free dry lamination method and an extrusion lamination method; a coextrusion method in which two or more resin layers are simultaneously extruded to be laminated on each other; and a coating method in which films are generated with a coater or the like. In consideration of adhesiveness, heat resistance, water resistance and others, the dry lamination method is preferable.

Examples of the adhesive used at the time of laminating the sealant film or the water vapor-barrier film on the concealable film include: isocyanate-based adhesives, polyurethane-based adhesives, polyester-based adhesives, polyethyleneimine-based adhesives, polybutadiene-based adhesives, polyolefin-based adhesives and alkyl titanate-based adhesives. Among these, in consideration of the effects such as adhesiveness, heat resistance and water resistance, isocyanate-based adhesives, polyurethane-based adhesives and polyester-based adhesives are preferable. Preferable are one of an isocyanate compound, polyurethane and urethane prepolymer or a mixture and a reaction product of two or more of an isocyanate compound, polyurethane and urethane prepolymer; a mixture and a reaction product of one or two or more of polyester, polyol and polyether with an isocyanate; or solutions of these or dispersions of these. According to the form of use of the packaging material of the present invention, for example, an adhesive allowing boiling treatment or an adhesive allowing retorting treatment can be used.

The method for applying an adhesive to the concealable film is not particularly limited; and common methods such as gravure roll coating, reverse roll coating, wire bar coating and air knife coating can be used.

The solid content concentration of the adhesive can be appropriately varied according to the specifications of the coating apparatus or the drying-heating apparatus; however, a too dilute solution sometimes decreases the laminate strength. On the other hand, when the solid content concentration is too high, a uniform adhesive is hardly obtained, and the coatability tends to cause problems. From such viewpoints, the solid content concentration of the adhesive is preferably 5 to 50% by mass.

The thickness of the adhesive layer is preferably 0.05 to 5.0 μm, in order to sufficiently increase the adhesiveness; in particular, in the case where the adhesive is applied by the dry lamination method, the thickness of the adhesive layer is preferably 1.0 to 5.0 μm.

[Packaging Material]

The packaging material of the present invention is constituted with a laminate having three layers, water vapor-barrier film/concealable film/sealant film.

Examples of the form of the packaging material include: a packaging bag, a sheet, a tray, a case, a vacuum pack packaging, a lid material, a carton packaging, a label, a window material, a container, an ampoule packaging; examples of the packaging bag include: a three-side seal bag, a four-side seal bag, a pillow bag, a standing pouch and a rocket packaging bag.

The packaging material of the present invention achieves particularly remarkable effects when used as a packaging bag. In other words, when a content containing oil and water is packed in the packaging bag and subjected to retorting treatment, the difference of the degree of whiteness between the portion in contact with oil and the portion in contact with water is extremely small, and hence the shade difference imparting the exterior appearance does not occur. Specifically, the below-described difference of the degree of whiteness between the portion in contact with oil and the portion in contact with water can be made to be less than 1.

The packaging material of the present invention allows the following contents to be packed or packaged: various foods and drinks such as fruits, juice, drinking water, alcoholic beverage, prepared food, fishery paste products, frozen food, meat products, cooked vegetables, boiled rice cake, soup and seasonings; liquid detergents; cosmetics; and chemicals. In particular, the packaging material of the present invention is suitable for packaging the products containing oils susceptible to oxidation degradation, and can be effective under the conditions of being exposed to sunlight or fluorescent lamp light at the time of store front display of articles for sale.

Hereinafter, the present invention is described more specifically with reference to Examples. However, the present invention is not limited to these Examples.

1. Measurement Methods (1) Thickness

The cross section of the concealable film was observed with a scanning electron microscope (SEM), and the total thickness of the concealable film and the thickness of each of the layers thereof were measured.

(2) Degree of Concealability

The optical density (O.D.) of the concealable film measured with an optical densitometer TR932 manufactured by MacBeth Co., Ltd. by using a transmission nozzle of 3 mm in diameter was taken as the degree of concealability.

(3) Tensile Strength and Tensile Elongation

The tensile strength and the tensile elongation of the concealable film were measured with the Autograph DSS-500 manufactured by Shimadzu Corp., according to ASTM D882, in the two directions, the MD and TD directions, of the film, and were evaluated on the basis of the average values. The measurements were performed for the sample allowed to stand for 2 hours in an environment of 23° C. and 50% RH, under the conditions of 23° C. and 50% RH.

(4) Stretchability

The case where the number of occurrences of breakage was less than 2 in the course of the formation of a film of 1000 m in length by stretching the concealable film was evaluated as G (Good) and the case where the above-described number of occurrences of breakage was 2 or more was evaluated as P (Poor).

(5) Weather Resistance

The concealable film was irradiated with ultraviolet light with the Ci4000 Weather-Ometer manufactured by Atlas Material Testing Technology LLC, according to ISO4892-2, under the following conditions: light source: xenon lamp, irradiance: 340 nm, 0.55 W/m$^2$, temperature: 60° C., relative humidity: 65%, irradiation time: 300 hours.

The tensile strength and the tensile elongation of the concealable film after the ultraviolet light irradiation were measured by the method described in foregoing (3), and the retention rates of these quantities were derived by using these quantities of the concealable film not irradiated with ultraviolet light, on the basis of the following formulas.

Tensile strength retention rate(%)=(tensile strength of concealable film after ultraviolet light irradiation/tensile strength of concealable film not irradiated with ultraviolet light)×100

Tensile elongation retention rate(%)=(tensile elongation of concealable film after ultraviolet light irradiation/tensile elongation of concealable film not irradiated with ultraviolet light)×100)

The weather resistance of the concealable film was evaluated on the basis of the following standards.

G (Good): Tensile strength/tensile elongation retention rate is 80% or more.

P (Poor): Tensile strength/tensile elongation retention rate is less than 80%.

(6) Evaluation of Exterior Appearance (Shade Unevenness) after Retorting Treatment In a prepared three-side seal bag, 50 g of a vegetable oil (salad oil, manufactured by Nisshin OilliO Group, Ltd.) and 50 g of water were packed and sealed, and the resulting package was subjected to a retorting treatment for 30 minutes with a high-temperature high-pressure cooking sterilizer (RCS-60SPXTG, manufactured by Hisaka Works, Ltd.) under the conditions of a temperature of 120° C. and a pressure of 1.8 kgf/cm$^2$, in a mode of hot water shower.

The degree of whiteness L (oil) of the portion in contact with oil and the degree of whiteness L (water) of the portion in contact with water were measured with a spectroscopic color difference meter SE-6000 manufactured by Nippon Denshoku Industries Co., Ltd., on the basis of a reflection method, according to the test method of JIS Z8729.

The case where the absolute value of L (oil)−L (water) was less than 1 was evaluated as G (Good) in exterior appearance because the color difference was not able to be verified as shade unevenness; the case where the above-described absolute value was 1 or more was P (Poor) in exterior appearance because the color difference was able to be visually verified as shade unevenness.

Figure 2:
FIG. 2 is an image of the exterior appearance, after retorting treatment, of a packaging bag using the concealable film of Comparative Example 6.

FIG. 1 shows an example of the exterior appearance image of a packaging bag free from verifiable shade unevenness and evaluated as G (Good) in exterior appearance. On the other hand, FIG. 2 shows an example of the exterior appearance image of a packaging bag with clear shade unevenness visually verifiable and evaluated as P (Poor) in exterior appearance.

(7) Laminate Performance after Retorting Treatment

In a prepared three-side seal bag, 100 ml of water was packed and sealed, and the resulting package was subjected to a retorting treatment for 30 minutes with a high-temperature high-pressure cooking sterilizer (RCS-60SPXTG, manufactured by Hisaka Works, Ltd.) under the conditions of a temperature of 120° C. and a pressure of 1.8 kgf/cm$^2$, in a mode of hot water shower.

The laminate constituting the three-side seal bag subjected to the retorting treatment was cut to a rectangle of 100 mm in MD×15 mm in TD; in the resulting rectangle, the one end in MD was peeled between the concealable film and the sealant film by 30 mm in MD with a pair of tweezers to prepare a specimen for the measurement of the laminate strength.

The specimen was allowed to stand for 2 hours or more in an environment of 23° C. and 50% RH, and then by using the AS-1S model Autograph manufactured by Shimadzu Corp. equipped with a load cell for 50 N and sample chucks, each of the ends of the peeled films was fixed and then the specimen was peeled by 30 mm in MD at a tensile rate of 300 mm/min while the specimen was being maintained in a "T-shape." For each of the 20 pieces of specimens, the strength at the time of peeling was measured, and the average value of the thus obtained measurement values was taken as the laminate strength. The case where the laminate strength was 3.0 N/cm or more was evaluated as G (Good), and the case where the laminate strength was less than 3.0 N/cm was evaluated as P (Poor).

The peeling interface exposed by the laminate strength measurement was identified, and the case where the number of the specimens peeled in the titanium oxide-containing layer was one or less was evaluated as G (Good) and the case where the number of the specimens peeled in the titanium oxide-containing layer was two or more was evaluated as P (Poor).

(8) Water Vapor Permeability

The water vapor permeability of the water vapor-barrier film constituting the laminate was measured according to the method described in the JIS K-7129B method, with the PERMATRAN-W 3/33 manufactured by Mocon, Inc., under the conditions of a temperature of 40° C. and a humidity of 90% RH. The unit is g/(m$^2$·day).

2. Materials

The materials used in following Examples and Comparative Examples are as follows.

(1) Nylon 6 resin

A1030BRF, relative viscosity: 3.0, manufactured by Unitika Ltd.

(2) MX nylon resin (MXD-6)

MX Nylon-S S6011, relative viscosity: 2.7, manufactured by Mitsubishi Gas Chemical Company, Inc.

(3) Amorphous polyamide resins
XE-3038 (diamine: hexamethylenediamine, 4,4'-diamino-3,3'-dimethyl-dicyclohexylene methane; dicarboxylic acid: terephthalic acid, isophthalic acid), manufactured by EMS-Chemie AG
Grivory G21 (diamine: hexamethylenediamine; dicarboxylic acid: terephthalic acid, isophthalic acid) (glass transition temperature: 125° C.), manufactured by EMS-Chemie AG
(4) Polyamide elastomer resin (PA elastomer)
Tuftec M1913 (M-SEBS), hydrogenated styrene-based thermoplastic elastomer (modified type)) (decomposition starting temperature: 245° C.), manufactured by Asahi Kasei Corp.
(5) Titanium oxide
Ti-Pure (rutile type, average particle size: 0.35 μm) manufactured by Du Pont Corp.
(6) Titanium oxide master batch
A blended material obtained by dry-blending 40 parts by mass of the nylon 6 resin and 60 parts by mass of titanium oxide was melt kneaded with a twin screw extruder with the cylinder temperature set at 250° C. and the diameter of 30 mm, and extruded in a strand shape, cooled, solidified and then cut. The obtained pellet was used as a titanium oxide master batch.
(7) Hindered amine-based light stabilizer (HALS)
CHIMASSORB 2020 FDL manufactured by Ciba Specialty Chemicals Inc.
(8) Water vapor-barrier film
Barrier PET film: VM-PET1011HF-CR (vapor deposited layer: alumina, water vapor permeability: 1.5 g/m²·day (40° C., 90% RH)) manufactured by Toray Advanced Film Co., Ltd.
Barrier nylon film: Ecosyar VN400 (vapor deposited layer: silica/alumina, water vapor permeability: 2 g/m²·day (40° C., 90% RH)) manufactured by Toyobo Co., Ltd.
(9) Sealant film
CPP film: Non-stretched polypropylene film RXC-21 (thickness: 50 μm) manufactured by Tohcello Co., Ltd.

Example 1

A blend was prepared by blending 89 parts by mass of the nylon 6 resin, 1 part by mass of the amorphous polyamide resin (XE-3038), 10 parts by mass of titanium oxide and 0.5 part by mass of the hindered amine-based light stabilizer, the resulting blend was fed to and melted in a single screw extruder with the cylinder temperature set at 260° C., and the molten blend was extruded from a T-die and brought into contact with a cooling roll set at a temperature of 20° C. to yield an unstretched sheet of 180 μm in thickness.
The obtained unstretched sheet was immersed in a warm water tank regulated at 50° C. for 2 minutes; successively the unstretched sheet was stretched with a simultaneous biaxial stretching machine at a stretching temperature of 180° C. in a longitudinal magnification of 3 and a transverse magnification of 3.3; the stretched sheet was heat treated at 200° C. for 5 seconds, further subjected to a 5% relaxation treatment in the transverse direction and cooled to yield a 18-μm thick concealable film having a single layer structure.
Corona discharge treatment was performed on one surface of the obtained concealable film, an adhesive (Takelac A-525/Takenate A-52, two-component type, manufactured by Mitsui Chemicals Polyurethanes, Inc.) was applied to the corona treated surface, and the applied film was dried with a hot air dryer set at 80° C. for 10 seconds so as for the applied amount of the adhesive to be 4 g/m². To the adhesive applied surface, the barrier PET film was bonded, as a water vapor-barrier film, with a nip roll (nip condition: 80° C.), to yield a laminate film including the concealable film and the barrier PET film.
Further, corona discharge treatment was applied to the concealable film surface of the laminate film, and an adhesive was applied to the corona treated surface and dried in the same manner as described above. To the adhesive applied surface, the sealant film was bonded so as for the corona treated surface to be superposed on the sealant film with a nip roll (nip condition: 80° C.), and the resulting laminate was aged in an atmosphere set at 40° C. for 72 hours. Thus, a laminate including three layers, barrier PET film/concealable film/sealant film, was obtained.
The obtained laminate including three layers, barrier PET film/concealable film/sealant film, was cut out to an external size of 300 mm in MD×200 mm in TD, and by using an impulse sealer manufactured by Fuji Impulse Co., Ltd., a three-side seal bag having an external size of 150 mm in MD times 200 mm in TD and a seal width of 10 mm was prepared as a packaging material.

Examples 2 to 3, 5 to 13, 15 to 16, Comparative Examples 1 to 5

In each of Examples 2 to 3, 5 to 13, 15 to 16, and Comparative Examples 1 to 5, a concealable film having a single layer structure, a laminate and a packaging material were prepared by the same operations as in Example 1 except that the types and the mixing proportions of the crystalline polyamide resin and the amorphous polyamide resin, the mixing proportions of titanium oxide and the hindered amine-based light stabilizer, the thickness of the film and others were altered as described in Table 1. In Comparative Example 5, the polyamide elastomer resin was used in place of the amorphous polyamide resin.

Example 4

A laminate and a packaging material were obtained by the same operations as in Example 3 except that the water vapor-barrier film was altered from the barrier PET film to the barrier nylon film.

Example 14

A concealable film, a laminate and a packaging material were obtained by the same operations as in Example 13 except that in the stretching of the unstretched sheet, the sheet was stretched in the longitudinal direction at a stretching temperature of 60° C. in a stretching magnification of 2.8, and then, successively stretched in the transverse direction in a magnification of 3.5.

Example 17

A concealable film having a single layer structure, a laminate and a packaging material were prepared by the same operations as in Example 2 except that the titanium oxide master batch was used in place of titanium oxide, and the mixing amount of the crystalline polyamide resin was altered.

Example 18

In a first extruder, 89 parts by mass of the nylon 6 resin, 1 part by mass of the amorphous polyamide resin (XE- 3038), 10 parts by mass of titanium oxide and 0.5 part by mass of the hindered amine-based light stabilizer were placed after blending, and were melt extruded at 260° C. On the other hand, in a second extruder, the nylon 6 resin was placed and melt extruded at 260° C. The two resins melted in the first and second extruders, respectively, were superposed on each other in a die, and a sheet having a three-layer B/A/B structure including the layer A and the layers B was extruded from a T-die, the layer A being the titanium oxide-containing layer A derived from the first extruder and the layer B being the layer B not containing titanium oxide. The extruded sheet was brought into close contact with a cooling roll with a surface temperature set at 20° C. to yield an unstretched sheet in which the thicknesses of the respective layers (B/A/B) were 40/100/40 μm, and the total thickness was 180 μm.

The obtained unstretched sheet was immersed in a warm water tank regulated at 50° C. for 2 minutes; successively the unstretched sheet was stretched with a simultaneous biaxial stretching machine at a stretching temperature of 180° C. in a longitudinal magnification of 3 and a transverse magnification of 3.3; the stretched sheet was heat treated at 200° C. for 5 seconds, further subjected to a 5% relaxation treatment in the transverse direction and cooled to yield a 18-μm thick, biaxially stretched concealable film having a multilayer structure. The thicknesses of the respective layers (B/A/B) of the concealable film were 4/10/4 (μm).

A laminate including the three layers, barrier PET film/ concealable film/sealant film, was obtained in the same manner as in Example 1 except that the obtained concealable film was used, and a packaging material was prepared by using the obtained laminate.

Examples 19 to 24, 26 to 32, and Comparative Examples 6 to 10

In each of Examples 19 to 24, 26 to 32, and Comparative Examples 6 to 10, a concealable film having a multilayer structure, a laminate and a packaging material were prepared by the same operations as in Example 18 except that the types and the mixing proportions of the crystalline polyamide resin and the amorphous polyamide used in the layer A, the mixing proportions of titanium oxide and the hindered amine-based light stabilizer, the layer structure involving the layer A and layer B, and others were altered as describe in Table 2. In Example 23, the crystalline polyamide resin was not mixed in the layer A. In Comparative Example 10, the polyamide elastomer resin was used in place of the amorphous polyamide resin.

Example 25

A laminate and a packaging material were prepared by the same operations as in Example 24 except that the water vapor-barrier film was altered from the barrier PET film to the barrier nylon film.

Example 33

A concealable film having a multilayer structure, a laminate and a packaging material were prepared by the same operations in Example 19 except that the titanium oxide master batch was used in place of titanium oxide, and the mixing amount of the crystalline polyamide resin in the layer A was altered.

Table 1 shows the compositions, properties and others for the concealable films having a single layer structure, the laminates, the packaging materials obtained in Examples 1 to 17 and Comparative Examples 1 to 5.

Table 2 shows the compositions, properties and others for the concealable films having a multilayer structure, the laminates, the packaging materials obtained in Examples 18 to 33 and Comparative Examples 6 to 10.

TABLE 1

Concealable films having a single layer structure

| | | Composition | | | | | | | Properties |
|---|---|---|---|---|---|---|---|---|---|
| | | Crystalline polyamide resin | | Amorphous polyamide resin | | Titanium oxide | HALS | | Biaxial | |
| | | Type | parts by mass | Type | parts by mass | parts by mass | parts by mass | Thickness μm | stretching method | Degree of concealability |
| Example | 1 | Nylon 6 | 89 | XE-3038 | 1 | 10 | 0.5 | 18 | Simultaneous | 0.38 |
| | 2 | Nylon 6 | 70 | XE-3038 | 20 | 10 | 0.5 | 18 | Simultaneous | 0.38 |
| | 3 | Nylon 6 | 50 | XE-3038 | 40 | 10 | 0.5 | 18 | Simultaneous | 0.38 |
| | 4 | Nylon 6 | 50 | XE-3038 | 40 | 10 | 0.5 | 18 | Simultaneous | 0.38 |
| | 5 | Nylon 6 | 85 | XE-3038 | 10 | 5 | 0.05 | 18 | Simultaneous | 0.30 |
| | 6 | Nylon 6 | 60 | XE-3038 | 10 | 30 | 0.5 | 18 | Simultaneous | 0.70 |
| | 7 | Nylon 6 | 40 | XE-3038 | 10 | 50 | 0.5 | 18 | Simultaneous | 1.20 |
| | 8 | Nylon 6 | 10 | XE-3038 | 40 | 50 | 0.5 | 18 | Simultaneous | 1.20 |
| | 9 | Nylon 6 | 94 | XE-3038 | 1 | 5 | 0.5 | 18 | Simultaneous | 0.34 |
| | 10 | Nylon 6 | 80 | XE-3038 | 10 | 10 | 0.5 | 10 | Simultaneous | 0.32 |
| | 11 | Nylon 6 | 80 | XE-3038 | 10 | 10 | 1 | 18 | Simultaneous | 0.38 |
| | 12 | Nylon 6 | 80 | XE-3038 | 10 | 10 | 2 | 30 | Simultaneous | 0.45 |
| | 13 | Nylon 6 | 80 | G21 | 10 | 10 | 0.5 | 18 | Simultaneous | 0.38 |
| | 14 | Nylon 6 | 80 | G21 | 10 | 10 | 0.5 | 18 | Successive | 0.42 |
| | 15 | MXD-6 | 50 | XE-3038 | 40 | 10 | 0.5 | 18 | Simultaneous | 0.40 |
| | 16 | Nylon 6 | 80 | G21 | 10 | 10 | — | 18 | Simultaneous | 0.38 |
| | 17 | Nylon 6 | 70 | XE-3038 | 20 | 10* | 0.5 | 18 | Simultaneous | 0.39 |
| Comparative Examples | 1 | Nylon 6 | 90 | — | — | 10 | 0.5 | 18 | Simultaneous | 0.38 |
| | 2 | Nylon 6 | 40 | XE-3038 | 50 | 10 | 0.5 | 18 | Simultaneous | 0.38 |
| | 3 | Nylon 6 | 87 | XE-3038 | 10 | 3 | 0.5 | 18 | Simultaneous | 0.24 |
| | 4 | Nylon 6 | 35 | XE-3038 | 10 | 55 | 0.5 | 18 | Simultaneous | — |
| | 5 | Nylon 6 | 80 | PA elastomer | 10 | 10 | 0.5 | 18 | Simultaneous | 0.38 |

TABLE 1-continued

| | | | Concealable films having a single layer structure | | | | | Packaging material | |
|---|---|---|---|---|---|---|---|---|---|
| | | | Properties | | | | Laminate | Property | |
| | | | Tensile strength MPa | Tensile elongation % | Stretch-ability | Weather resistance (retention rate) | | Constitution Water vapor barrier film Type | Exterior appearance evaluation after retorting treatment (shade unevenness) |
| | | | | | | Tensile strength | Tensile elongation | | |
| Examples | 1 | | 220 | 100 | G | G | G | PET-based | G |
| | 2 | | 195 | 109 | G | G | G | PET-based | G |
| | 3 | | 190 | 115 | G | G | G | PET-based | G |
| | 4 | | 190 | 115 | G | G | G | Nylon-based | G |
| | 5 | | 240 | 110 | G | G | G | PET-based | G |
| | 6 | | 210 | 100 | G | G | G | PET-based | G |
| | 7 | | 189 | 92 | G | G | G | PET-based | G |
| | 8 | | 183 | 88 | G | G | G | PET-based | G |
| | 9 | | 245 | 121 | G | G | G | PET-based | G |
| | 10 | | 200 | 108 | G | G | G | PET-based | G |
| | 11 | | 221 | 108 | G | G | G | PET-based | G |
| | 12 | | 230 | 125 | G | G | G | PET-based | G |
| | 13 | | 212 | 109 | G | G | G | PET-based | G |
| | 14 | | 235 | 95 | G | G | G | PET-based | G |
| | 15 | | 192 | 108 | G | G | G | PET-based | G |
| | 16 | | 213 | 111 | G | P | P | PET-based | G |
| | 17 | | 197 | 110 | G | G | G | PET-based | G |
| Comparative Examples | 1 | | 220 | 102 | G | G | G | PET-based | P |
| | 2 | | 150 | 60 | G | G | G | PET-based | G |
| | 3 | | 246 | 106 | G | G | G | PET-based | G |
| | 4 | | 160 | 70 | P | G | G | PET-based | G |
| | 5 | | 223 | 112 | G | G | G | PET-based | P |

*Titanium oxide master batch was used.

TABLE 2

| | | Concealable films having a multilayer structure | | | | | | | | | |
|---|---|---|---|---|---|---|---|---|---|---|---|
| | | Layer A | | | | | | Thickness | | | |
| | | Crystalline polyamide resin | | Amorphous polyamide resin | | Titanium oxide | HALS | Layer B Nylon 6 | | Thick-nesses | Total thick-ness | | Properties Degree of |
| | | Type | parts by mass | Type | parts by mass | parts by mass | parts by mass | % by mass | Layer structure | of layers μm | μm | Biaxial stretching method | conceal-ability |
| Examples | 18 | Nylon 6 | 89 | XE-3038 | 1 | 10 | 0.5 | 100 | B/A/B | 4/10/4 | 18 | Simultaneous | 0.30 |
| | 19 | Nylon 6 | 80 | XE-3038 | 10 | 10 | 0.5 | 100 | B/A/B | 4/10/4 | 18 | Simultaneous | 0.33 |
| | 20 | Nylon 6 | 50 | XE-3038 | 40 | 10 | 0.5 | 100 | B/A/B | 4/10/4 | 18 | Simultaneous | 0.32 |
| | 21 | Nylon 6 | 60 | XE-3038 | 10 | 30 | 1 | 100 | B/A/B | 4/10/4 | 18 | Simultaneous | 0.54 |
| | 22 | Nylon 6 | 30 | XE-3038 | 10 | 60 | 2 | 100 | B/A/B | 4/10/4 | 18 | Simultaneous | 1.02 |
| | 23 | — | — | XE-3038 | 40 | 60 | 2 | 100 | B/A/B | 4/10/4 | 18 | Simultaneous | 1.02 |
| | 24 | Nylon 6 | 35 | XE-3038 | 15 | 50 | 0.5 | 100 | B/A/B | 6/6/6 | 18 | Simultaneous | 0.37 |
| | 25 | Nylon 6 | 35 | XE-3038 | 15 | 50 | 0.5 | 100 | B/A/B | 6/6/6 | 18 | Simultaneous | 0.37 |
| | 26 | Nylon 6 | 30 | XE-3038 | 10 | 60 | 1 | 100 | B/A/B | 7/4/7 | 18 | Simultaneous | 0.32 |
| | 27 | Nylon 6 | 80 | XE-3038 | 10 | 10 | 0.5 | 100 | B/A/B | 8/9/8 | 25 | Simultaneous | 0.31 |
| | 28 | Nylon 6 | 60 | XE-3038 | 10 | 30 | 0.5 | 100 | A/B/A | 5/8/5 | 18 | Simultaneous | 0.41 |
| | 29 | Nylon 6 | 80 | XE-3038 | 10 | 10 | 0.5 | 100 | A/B | 9/9 | 18 | Simultaneous | 0.32 |
| | 30 | Nylon 6 | 80 | G21 | 10 | 10 | 0.5 | 100 | B/A/B | 4/10/4 | 18 | Simultaneous | 0.31 |
| | 31 | MXD-6 | 40 | XE-3038 | 10 | 50 | 0.5 | 100 | B/A/B | 6/6/6 | 18 | Simultaneous | 0.38 |
| | 32 | Nylon 6 | 60 | XE-3038 | 10 | 30 | — | 100 | B/A/B | 4/10/4 | 18 | Simultaneous | 0.54 |
| | 33 | Nylon 6 | 80 | XE-3038 | 10 | 10* | 0.5 | 100 | B/A/B | 4/10/4 | 18 | Simultaneous | 0.33 |
| Comparative Examples | 6 | Nylon 6 | 50 | — | — | 50 | 0.5 | 100 | B/A/B | 6/6/6 | 18 | Simultaneous | 0.37 |
| | 7 | Nylon 6 | 40 | XE-3038 | 50 | 10 | 0.5 | 100 | B/A/B | 4/10/4 | 18 | Simultaneous | 0.32 |
| | 8 | Nylon 6 | 85 | XE-3038 | 10 | 5 | 0.5 | 100 | B/A/B | 4/10/4 | 18 | Simultaneous | 0.21 |
| | 9 | Nylon 6 | 25 | XE-3038 | 10 | 65 | 2 | 100 | B/A/B | 4/10/4 | 18 | Simultaneous | 1.05 |
| | 10 | Nylon 6 | 80 | PA elastomer | 10 | 10 | 0.5 | 100 | B/A/B | 4/10/4 | 18 | Simultaneous | 0.32 |

TABLE 2-continued

|  |  | Concealable films having a multilayer structure ||||||||| Packaging Material |
|---|---|---|---|---|---|---|---|---|---|---|---|
|  |  | Properties ||||||||  Laminate | Property |
|  |  | Tensile strength MPa | Tensile elongation % | Stretch-ability | Weather resistance retention rate) || Laminate performances after retorting treatment || Peeling interface | Constitution Water vapor barrier film Type | Exterior appearance evaluation after retorting treatment (shade unevenness) |
|  |  |  |  |  | Tensile strength | Tensile elongation | Strength N/cm | Evaluation |  |  |  |
| Examples | 18 | 235 | 111 | G | G | G | 7.0 | G | G | PET-based | G |
|  | 19 | 231 | 125 | G | G | G | 7.0 | G | G | PET-based | G |
|  | 20 | 198 | 134 | G | G | G | 7.0 | G | G | PET-based | G |
|  | 21 | 228 | 109 | G | G | G | 7.0 | G | G | PET-based | G |
|  | 22 | 194 | 113 | G | G | G | 7.1 | G | G | PET-based | G |
|  | 23 | 190 | 100 | G | G | G | 7.0 | G | G | PET-based | G |
|  | 24 | 214 | 109 | G | G | G | 7.0 | G | G | PET-based | G |
|  | 25 | 214 | 109 | G | G | G | 7.0 | G | G | Nylon-based | G |
|  | 26 | 231 | 110 | G | G | G | 7.0 | G | G | PET-based | G |
|  | 27 | 241 | 127 | G | G | G | 7.2 | G | G | PET-based | G |
|  | 28 | 223 | 115 | G | G | G | 7.0 | G | G | PET-based | G |
|  | 29 | 231 | 110 | G | G | G | 7.0 | G | G | PET-based | G |
|  | 30 | 221 | 118 | G | G | G | 7.0 | G | G | PET-based | G |
|  | 31 | 210 | 105 | G | G | G | 7.0 | G | G | PET-based | G |
|  | 32 | 229 | 111 | G | P | P | 7.0 | G | G | PET-based | G |
|  | 33 | 232 | 127 | G | G | G | 7.0 | G | G | PET-based | G |
| Comparative Examples | 6 | 220 | 110 | G | G | G | 2.8 | P | P | PET-based | P |
|  | 7 | 170 | 69 | G | G | G | 7.0 | G | G | PET-based | G |
|  | 8 | 234 | 110 | G | G | G | 7.0 | G | G | PET-based | G |
|  | 9 | 171 | 70 | P | G | G | 7.0 | G | G | PET-based | G |
|  | 10 | 234 | 117 | G | G | G | 7.0 | G | G | PET-based | P |

*Titanium oxide master batch was used.

As shown in Tables 1 and 2, in Examples 1 to 33, concealable films provided with excellent concealability and mechanical properties were obtained; moreover, the packaging bags constituted with these concealable films did not undergo the occurrence of shade unevenness and the exterior appearance of the packaging materials was not impaired even in the cases where contents containing oil and water were packed in the packaging bags and subjected to retorting treatment, as shown by the exterior appearance image (FIG. 1) of the packaging bag, after retorting treatment, using the concealable film of Example 24. The concealable films of Examples including the hindered amine-based light stabilizer, except for Examples 16 and 32, were excellent in weather resistance. The concealable films having a multilayer structure of Examples 18 to 33 each include the amorphous polyamide resin in the titanium oxide-containing layer, and hence had excellent laminate strength even after being subjected to retorting treatment.

The concealable films of Comparative Examples 1, 5, 6 and 10 acquired excellent mechanical properties, but did not include the amorphous polyamide resin in the titanium oxide-containing layer; hence in each of the packaging bags constituted with these concealable films, the color tone difference of the exterior appearance of the packed body occurred between the portion in contact with edible oil and the portion in contact with water in the inside of the packaging bag, as shown by the exterior appearance image (FIG. 2) of the packaging bag, after retorting treatment, using the concealable film of Comparative Example 6; and the color tone difference was visually verified as clear shade unevenness. The concealable film having a multilayer structure of Comparative Example 6 did not include the amorphous polyamide resin in the titanium oxide-containing layer, and hence, after retorting treatment, titanium oxide was aggregated and the laminate strength was made to be low.

The concealable films of Comparative Examples 2 and 7 did not undergo the occurrence of shade unevenness, but in each of these concealable films, the content of the amorphous polyamide resin was larger than the specified content, and hence the mechanical properties were remarkably low, and the tensile strength of 180 MPa or more and the tensile elongation of 80% or more were not able to be obtained.

The concealable films of Comparative Examples 3 and 8 did not undergo the occurrence of shade unevenness, but in each of these concealable films, the content of titanium oxide was smaller than the specified content, and hence the degree of concealability was less than 0.3, and no sufficient concealability was obtained.

The concealable films of Comparative Examples 4 and 9 did not undergo the occurrence of shade unevenness, but in each of these concealable films, the content of titanium oxide was larger than the specified content, and hence the mechanical properties were low, additionally in the stretching step, the breakage frequency of the film was high and the operability was remarkably low; accordingly, these concealable films were not able to be put to practical use.

The invention claimed is:

1. A concealable film comprising 10 to 94% by mass of a crystalline polyamide resin, 1 to 40% by mass of an amorphous polyamide resin and 5 to 50% by mass of titanium oxide, with the proviso that the total content of these is 100% by mass, the crystalline polyamide resin being one selected from a group consisting of nylon 6 and polymetaxylylene adipamide, the amorphous polyamide resin including terephthalic acid and isophthalic acid as a dicarboxylic acid component and hexamethylenediamine and 4,4'-diamino-3,3'-dimethyl-dicyclohexylene methane as a diamine component, the concealable film being stretched and having a thickness of 10 to 30 μm.

2. The concealable film according to claim 1, wherein the degree of concealability thereof is 0.3 or more.

3. The concealable film according to claim 1, wherein the crystalline polyamide resin is nylon 6.

4. The concealable film according to claim 1, further comprising a hindered amine-based light stabilizer, wherein the content of the hindered amine-based light stabilizer is 0.01 to 2 parts by mass in relation to 100 parts by mass of the total content of the crystalline polyamide resin, the amorphous polyamide resin and titanium oxide.

5. The concealable film according to claim 1, wherein the concealable film is subjected to a simultaneous biaxial stretching.

6. A laminate wherein a water vapor-barrier film is laminated on one surface of the concealable film according to claim 1, and a sealant film is laminated on the other surface of said concealable film.

7. The laminate according to claim 6, wherein the water vapor permeability of the water vapor-barrier film is 70 $g/m^2 \cdot day$ (40° C., 90% RH) or less.

8. A packaging material constituted with the laminate according to claim 6.

9. The packaging material according to claim 8 for packing a content containing water and oil.

10. The packaging material according to claim 9 to be used for retorting treatment.

11. A concealable film wherein on at least one surface of a layer A comprising 1 to 40% by mass of an amorphous polyamide resin, 10 to 60% by mass of titanium oxide and 0 to 89% by mass of a crystalline polyamide resin, with a proviso that the total content of these is 100% by mass, the crystalline polyamide resin being one selected from a group consisting of nylon 6 and polymetaxylylene adipamide, the amorphous polyamide resin including terephthalic acid and isophthalic acid as a dicarboxylic acid component and hexamethylenediamine and 4,4'-diamino-3,3'-dimethyl-dicyclohexylene methane as a diamine component, a layer B constituted with a polyamide resin and not including titanium oxide is laminated, the polyamide resin constituting the layer B including 80% or more by mass of nylon 6, the concealable film being stretched and having a thickness of 10 to 30 μm and the concealable film having a multilayer structure that is one of B/A/B and B/A/B/A/B wherein each layer A directly contacts each layer B.

12. The concealable film according to claim 11, wherein the laminate strength between each layer A and layer B after a retorting treatment at 120° C. for 30 minutes is 3.0 N/cm or more.

* * * * *